H. P. MACDONALD & E. M. HUGGINS.
METHOD OF AND APPARATUS FOR ELECTRIC HEATING AND TEMPERING.
APPLICATION FILED JUNE 14, 1916.

1,274,919.

Patented Aug. 6, 1918.
3 SHEETS—SHEET 1.

WITNESS:

INVENTORS
Harry P. Macdonald
E. M. Huggins
BY
ATTORNEYS.

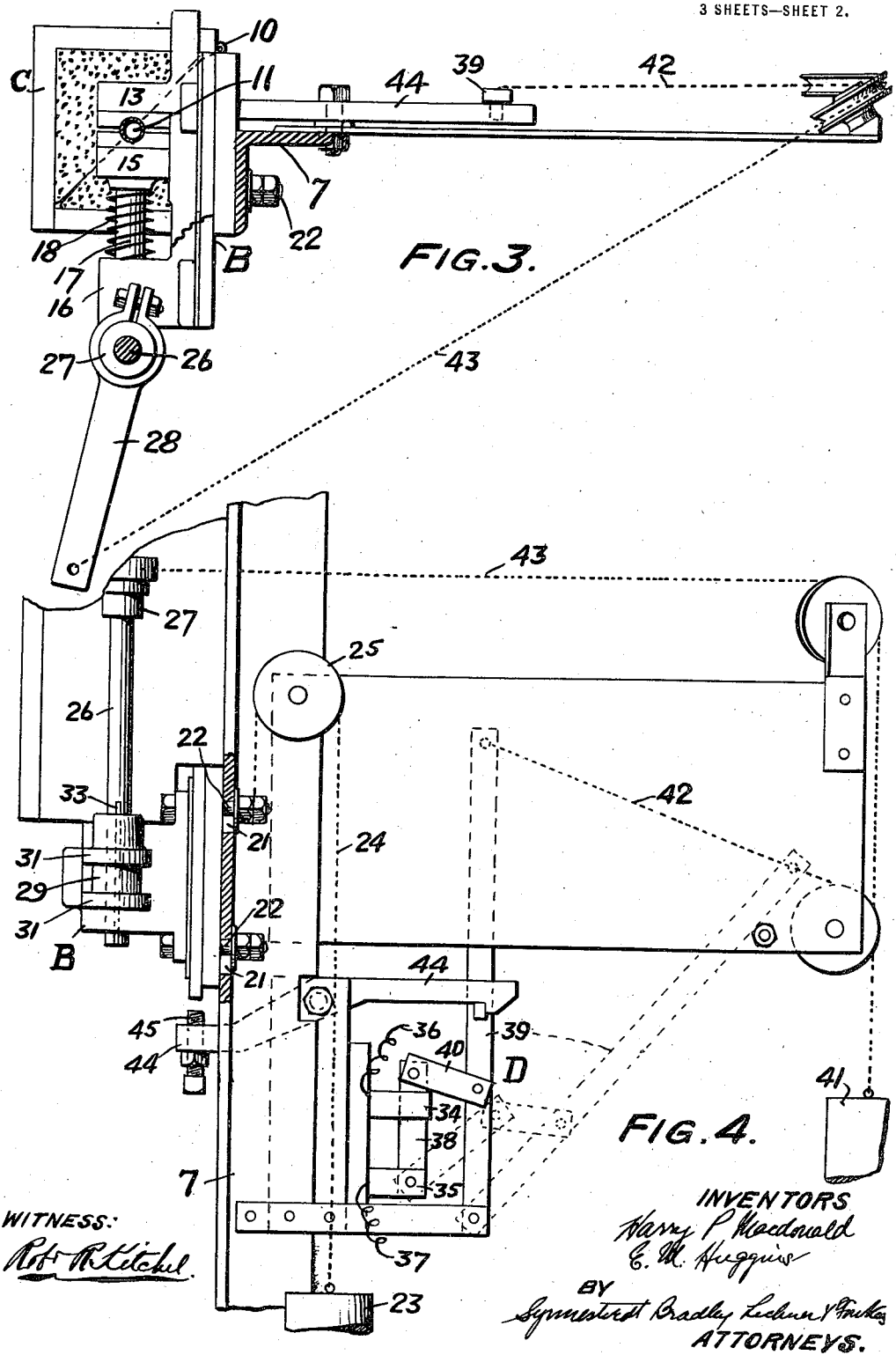

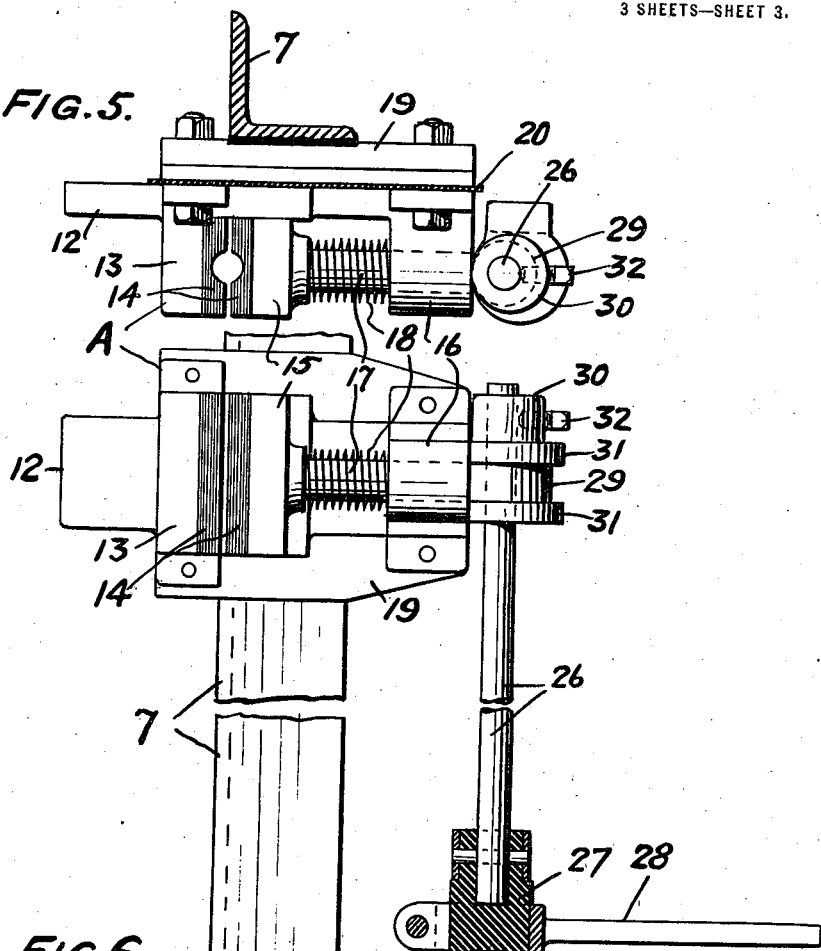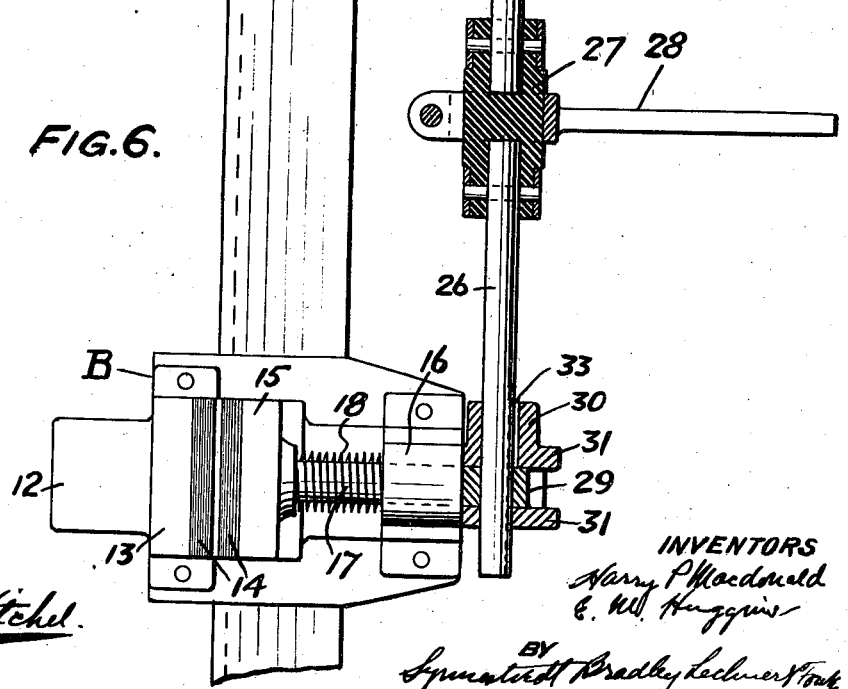

UNITED STATES PATENT OFFICE.

HARRY P. MACDONALD, OF MONTCLAIR, NEW JERSEY, AND EDWARD M. HUGGINS, OF NEW YORK, N. Y., ASSIGNORS TO THE SNEAD & CO. IRON WORKS, OF JERSEY CITY, NEW JERSEY, A CORPORATION OF NEW JERSEY.

METHOD OF AND APPARATUS FOR ELECTRIC HEATING AND TEMPERING.

1,274,919.  Specification of Letters Patent.  Patented Aug. 6, 1918.

Application filed June 14, 1916. Serial No. 103,627.

*To all whom it may concern:*

Be it known that we, HARRY P. MACDONALD and EDWARD MELVILLE HUGGINS, both citizens of the United States, residing in Montclair, county of Essex, and State of New Jersey, and New York city, county of New York, and State of New York, respectively, have invented certain new and useful Improvements in Methods of and Apparatus for Electric Heating and Tempering, of which the following is a specification.

This invention has relation to a method of and apparatus for electric heating and tempering or annealing. It has for one of its primary objects the provision of an improved apparatus whereby the article to be tempered is heated by its internal resistance to a current of electricity which is passed therethrough. Another one of the objects of our invention is the provision of improved apparatus wherein the article to be heated acts as its own thermostat, cutting off the current. Our invention also contemplates the provision of means whereby the article to be heated is supported so that it will fall, when released, into a quenching bath, the moment of release being determined by the state of the article.

In addition, our invention also contemplates the provision of an improved method for electrically heating and tempering or annealing metallic articles; the provision of an improved method of electrical heating whereby the article being heated acts as its own thermostat; and in general the provision of a simple method and apparatus whereby tubes may be expeditiously electrically heated and tempered.

Figure 1:
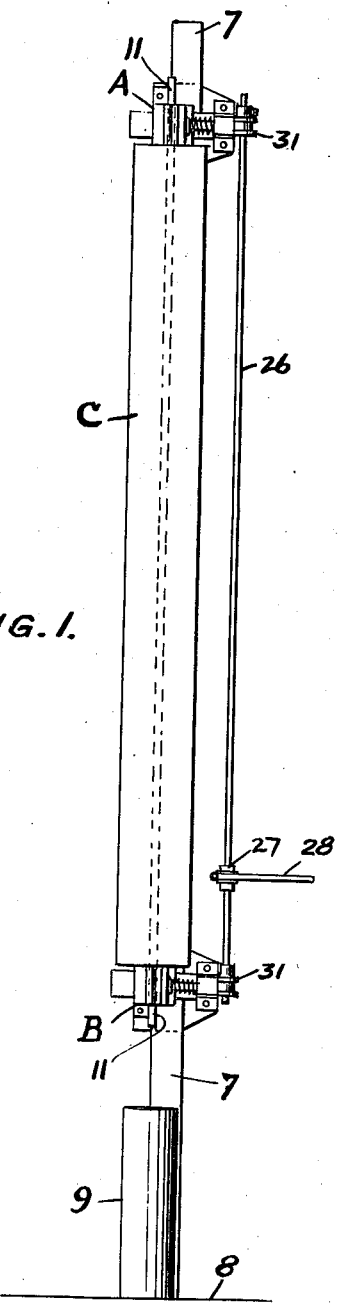
Figure 2:
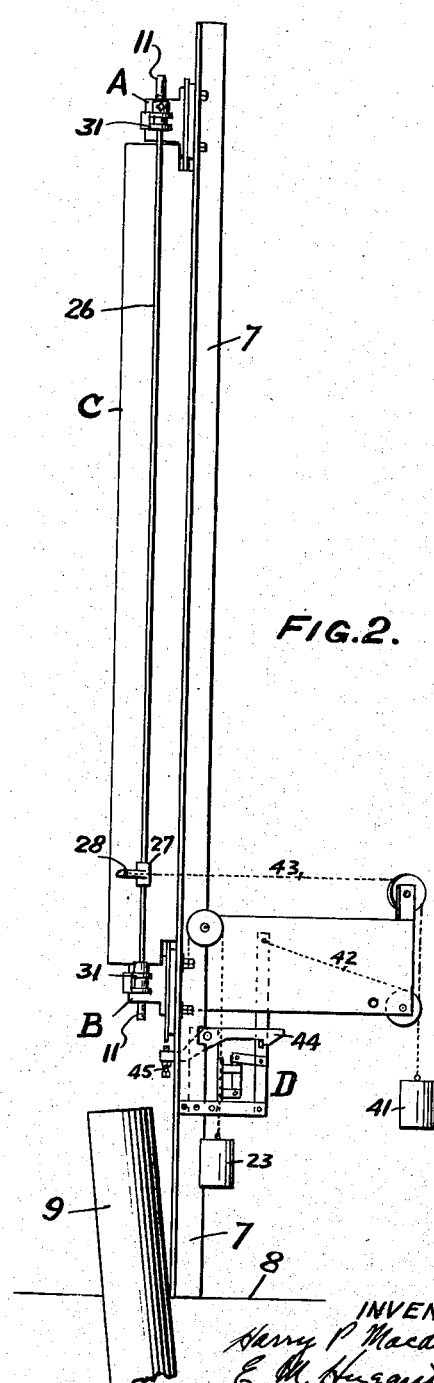

The foregoing, together with such other objects as may hereinafter appear, or are incident to our invention, we obtain by means of an improved method and apparatus, one embodiment of which is illustrated in preferred form in the accompanying drawings, wherein:

Figure 1 is a front elevation of our improved machine with a tube in position to be heated thereby; Fig. 2 is a side elevation of the device shown in Fig. 1; Fig. 3 is a sectional view taken through the machine and showing the lower portions thereof in plan view, but on an enlarged scale; Fig. 4 is a side elevation of Fig. 3 partially in section; Fig. 5 is a plan view of the top of the machine on a larger scale; and Fig. 6 is a side elevation of Fig. 5 partially broken away.

Our improved apparatus will be first described, attention being directed to Figs. 1 and 2 for the general arrangement. From inspection of these figures it will be seen that the machine comprises a vertical frame 7 which may be of any preferred construction but which is shown as being composed of an angle, the supporting framework of said angle not being shown. Embedded in the foundation or floor 8 and adjacent to the frame 7 is a pipe or casing 9 which is filled with a quenching material, such for example, as oil, the pipe being angularly disposed for a purpose which will hereinafter appear. The frame 7 has secured thereto two supports A and D which serve as a means for supporting the article to be heated and also as contacts by means of which current from a suitable source is passed through the article. The upper support A is relatively immovable while the lower support B has sliding movement relative to the frame, as will further appear. Intermediate the supports A and B, a box C lined with insulating material is secured to the supporting frame, such box being preferably composed of two parts hinged together as at 10, as indicated in Fig. 3. The box is opened to permit of the insertion of the article to be heated and it is then closed and serves as a protection to the workman and also as a means for shielding the article being heated, thereby maintaining uniform external heat conditions, and also limiting the amount of radiation. The switch mechanism D is shown diagrammatically in Fig. 2.

The specific construction of the supports, their operating mechanism and the switch mechanism will now be described, attention being directed particularly to Figs. 3 to 6. The supports A and B are constructed in this exemplification of our invention to support a length of tubing 11, about ten feet long, and an inch in diameter, the metal being a sixteenth of an inch thick.

The upper support A comprises a casting 12 having a fixed jaw 13, to which is attached a laminated copper contact 14. A movable contact jaw 15 is slidably carried in the ear 16 of the casting 12 by means of the stem 17, such stem being threaded into the jaw. The jaw 15 is also provided with a laminated copper contact 14 and it is normally held in closed position by means of the spring 18 which is interposed between the jaw 15 and the ear 16. The casting 12 is secured to the angle 7 in any preferred manner, such for example as by the plates 19, suitable insulating material 20 being interposed therebetween. The lower support B is similarly constructed but instead of being rigidly secured to the frame 7, it is mounted for vertical movement, this being provided for by means of the slots 21 formed in the angle and through which the fastening bolts 22 pass. The slots 21 are of a length sufficient to provide the necessary movement, and the support is normally held in raised position by means of the weight 23 and the cord 24 which is secured to the upper bolt 22 and passes over the sheave 25. By this arrangement, the support B is yieldingly held in upper position but is free to move downwardly as the tube expands during the heating process. By this arrangement, distortion of the tube is prevented, while at the same time the movement of the support is utilized to effect a cut-off of the current, as will further appear.

In order to simultaneously operate the movable jaws of the upper and lower supports, we provide a two-part operating shaft 26, the parts of which are secured together but insulated from each other by means of the hub 27 of the operating lever 28. The stems 17 which operate the movable jaws have eyes 29 at their outer ends, and the shaft 26 passes through the eyes. A pair of cam members 30 is mounted on the shaft 26 in such manner that they bear against the end faces of the castings 12, and when turned, force the shaft bodily away from the castings, thus retracting the stems 17 against the pressure of the springs 18 and opening the jaws 15. Each cam has a pair of jaws 31 adapted to embrace the eyes 29 of the stems 17, this arrangement serving as a convenient means for positioning the cam. The upper cam 30 is secured to the shaft 26 by means of the set screw 32, and the upper cam therefore serves as a support for the shaft. The lower cam is keyed to the shaft 26 by means of the key 33, the key 33 having sliding engagement with its keyway to permit of vertical movement of the support B when the tube 11 expands.

The switch mechanism D is suitably supported by and insulated from the frame 7 and comprises two terminals 34 and 35, from which the leads 36 and 37 extend to the jaws of the upper and lower supports respectively. The circuit is closed by means of the knife switch 38 which is pivoted to the terminal 35 and connected to the swinging arm 39 by means of the link 40. The arm 39 is normally held in the dotted position indicated in Fig. 4 by means of the weight 41 and cord 42, in which position the circuit is broken. A second cord 43, connected to the operating handle 28 is fastened to the cord 42 so that the weight 41 operates the arm 39 and the operating handle 28 in unison. When the arm 39 is moved to the position indicated in full lines, that is, when it is moved to close the switch, it is held in position by means of the pivoted trip 44, at one end of which is a set screw 45 adapted to be engaged by the support B when the latter is moved downwardly by the expansion of the tube 11. When this occurs, the trip is released and the weight 41 moves the arm 39 to break the circuit and also turns the operating handle 28 so as to rotate the shaft, thereby retracting the movable jaws 15 and releasing the tube 11 which then falls into the casing 9 and is quenched. When the tube has been released, the weight 23 returns the support B to its upper position. The box C may be then opened and the operation repeated. Owing to the angular disposition of the casing 9, the tubes 11, as they fall therein, slide to the outer portion of the casing so that, when the next tube falls, it will not impinge upon those already within the casing. The tubes which have been quenched are periodically removed.

It will be seen from the foregoing that the tube which is being heated acts as its own thermostat to cut off the supply of current when it has been heated to a pre-determined temperature. The temperature to which the tubes are heated can thus be quite accurately determined in advance, because the amount of expansion is approximately in ratio with the degree of heat, thus, for example, in the particular work being done in the present application of our invention, we find that when the tube is expanded about one inch, it will have been heated to the desired temperature. By altering the adjustment of the set screw 45 so as to cause the support B to engage it at an earlier or a later interval, the temperature to which the tube will be heated will be lowered or increased.

Our apparatus is simple in construction and expeditious in operation, and is far more efficient and economical than the ordinary process of heating and tempering, particularly when applied to the character of work herein described, namely, the heating and tempering of long and thin articles.

Superior results are also achieved because of the uniformity of the heating which, of course, reduces the liability of warping or distortion and secures uniformity of hardness and toughness throughout the metal. Uniformity in results is also obtained by virtue of the automatic character of the operation. Another advantage of the apparatus is that it is very compact, and the operator is fully protected. Another object of the construction is that the cams 30 act as locks, retaining the movable jaws in open position until the operating handle 28 releases the cams.

In order that a clearer understanding may be had of our improved method, a statement of the operation will be here made. The box C having been opened and the jaws opened by means of the operating shaft 26, the workman places a tube in the jaws with lower jaw in its raised position, releases the jaws, closes the box and then swings the arm 39 to close the switch, the arm being held in closed position by means of the trip 44. The current now passes through the tube and, because of the internal resistance, the tube becomes heated and gradually expands until such time as the lower support B releases the trip 44, whereupon the circuit is automatically broken and the jaws opened, the tube falling into the bath of oil. The operation is then repeated, and when the casing 9 is substantially filled, the tempered tubes are removed therefrom as may be required. It will be seen from the foregoing that our improved method consists in heating the tube by passing an electric current therethrough and by using the tube as its own thermostat to cut off the current. Our method also contemplates using the expansion of the tube to effect its release from the machine. In addition, our method comprises the step of determining the temperature to which the tube shall be heated by means of its expansion, that is to say, the standard to which the tube shall be heated is pre-determined by the gap between the support B and the trip mechanism for breaking the circuit, this gap being adjustable. Still another object of our invention resides in heating the articles in vertical position, the weight being taken from above. The advantage of this is that if the tube happens to be warped or distorted, it will straighten out when it becomes hot. Furthermore, it will be seen that by our improved process the particles of the article being heated will be heated simultaneously, which tends to secure uniformity and superiority of product, and other advantages.

While we have described our improved apparatus and process as applied to the hardening and tempering of articles it will of course be understood that it is equally well adaptable for annealing purposes, and the terms "tempering process" and "heating and tempering apparatus" as used in the specification and claims are to be understood in their generic sense and as applicable to annealing as well as hardening and tempering operations. It is also to be understood that the term "quenching bath" is likewise generically used for it will be noted that materials other than oil may be employed to cool the articles to be treated.

Among other objects incident to utilizing the expansion of the article to control temperature conditions is that the current may be entirely cut off, or the heat may be regulated, as where it is desirable to keep the article at a certain temperature for a considerable period of time. Thus the expansion of the article being treated may be utilized to operate a rheostat in such a way as to vary the voltage of the current supplied, or to insert resistance so that the article can be kept at any temperature suitable to the particular work being done. It is also to be noted in this connection that the expansion of the article may be similarly used to increase the voltage or to cut out resistance so as to expedite the process, the advantage of which will be readily understood from the fact that the electrical resistance of metal increases with the heat increase. Thus it will be seen that in some cases if the same voltage which is necessary at the end of the process in order to attain the desired temperature, were used at the beginning of the process, damage to the apparatus might result or there might be too heavy a load on the generating system. On the other hand, if a low voltage such as might be suitable at the beginning of the process were used all the way through, the desired temperature might not be reached because of the increase in the resistance offered by the article as it becomes heated.

We claim:—

1. In a heating and tempering apparatus, the combination of a pair of supports adapted to receive the article to be heated, one of said supports being movable by the article as it expands under heat, means for heating the article, and automatic means for cutting off the heat actuated by the movement of the movable support.

2. In a heating and tempering apparatus, the combination of a pair of supports adapted to receive the article to be heated, means for connecting said supports to a source of electric current, and automatic means for breaking the circuit and for releasing the article.

3. In a heating and tempering apparatus, the combination of a pair of supports adapted to receive the article to be heated, means for connecting said supports to a source of electric current, and automatic means for breaking the circuit and for releasing the article actuated by the expansion of the article.

4. In a heating and tempering apparatus, the combination of a frame, a fixed support and a movable support carried thereby adapted to receive the article to be heated, means for heating the article, means for releasing the article from its support, and a bath below the supports.

5. In a heating and tempering apparatus, the combination of two pairs of supporting jaws adapted to receive the article to be heated, and means for simultaneously operating said two pairs of jaws.

6. In a heating and tempering apparatus, the combination of a pair of supports for the article to be heated, one of which is movable relative to the other, means for connecting said supports to a source of electric current, a switch for breaking the circuit normally held in open position, and a trip for holding said switch in closed position, said trip being released by the expansion of the article.

7. In a heating and tempering apparatus, the combination of a frame, a plurality of supports adapted to releasably receive the article to be heated, yielding means normally holding said supports in closed article-engaging position, and camming means adapted to open said supports.

8. In a heating and tempering apparatus, the combination of a frame, a plurality of supports adapted to releasably receive the article to be heated, yielding means normally holding said supports in closed article-engaging position, a cam for opening each support, and means for simultaneously operating the cams.

9. A heating and tempering apparatus, comprising in combination a supporting structure provided with means for receiving and supporting the article to be heated, so that expansion takes place away from said means, a movable abutment in the path of movement, and means coöperating with said abutment for cutting off the heat.

10. A heating and tempering apparatus, comprising in combination a supporting structure provided with means for receiving and supporting the article to be heated, so that expansion takes place away from said means, a member movable with the article and means coöperating therewith for cutting off the heat.

11. An apparatus for heating and tempering metallic objects comprising in combination, means for heating the article substantially throughout its length, and a supporting frame having means for suspending the article while it is being heated at a point adjacent the upper end thereof, whereby warping and distortion of the article are prevented.

12. An apparatus for heating and tempering metallic objects comprising in combination a supporting frame having means for suspending the article at a point adjacent the upper end thereof, a second means adapted to support the article at a point adjacent the lower end thereof and place it under tension thereby preventing warping and distortion, said two means being relatively movable, and means for heating the article.

13. An apparatus for heating and tempering metallic objects comprising in combination a main structure provided with a plurality of jaw members adapted to receive the ends of and clamp the article electrically clear of the main structure and arranged to prevent distortion thereof, and means for passing an electric current through the article independently of the main structure.

14. An apparatus for heating and tempering metallic objects comprising in combination means for removably supporting the article with freedom to expand, means for heating the article, and automatic means actuated by the expansion of the article to cut off the heat.

15. An apparatus for heating and tempering metallic objects comprising releasable means for suspending the article in vertical position to gravity discharge on release of said means, and a tubular receptacle located in the path of discharge but inclined so that the articles will shift out of the path of direct discharge.

16. In a heating and tempering apparatus, a releasable supporting means for the article to be treated, said means being actuated by the expansion of the article to automatically release the same.

17. In a heating and tempering apparatus, the combination of a bath and a releasable support for the article adapted to discharge the article into the bath, said support being actuated by the expansion of the article to automatically release the same.

18. An apparatus for heat treating metallic articles comprising the combination of means for fixedly supporting the article at an end thereof and under tension and with freedom to expand during heating, and means for heating the article substantially uniformly substantially throughout its length.

19. An apparatus for heat treating metallic articles comprising the combination of means for releasably supporting the article at an end thereof with freedom to expand during heating, means for heating the article substantially uniformly substantially throughout its length, a quenching bath, and means for subjecting the article being treated to the bath.

20. An apparatus for heat treating metallic articles comprising the combination of a suitable frame, means for heating the article substantially uniformly substantially throughout its length, and means for removably supporting the article in the frame and holding it against warping or distortion throughout its length with freedom to expand during the heating.

In testimony whereof, we have hereunto signed our names.

HARRY P. MACDONALD.
E. MELVILLE HUGGINS.